J. G. OEHLER.
SUBMARINE MINNOW.
APPLICATION FILED MAR. 9, 1917.
1,251,810.
Patented Jan. 1, 1918.
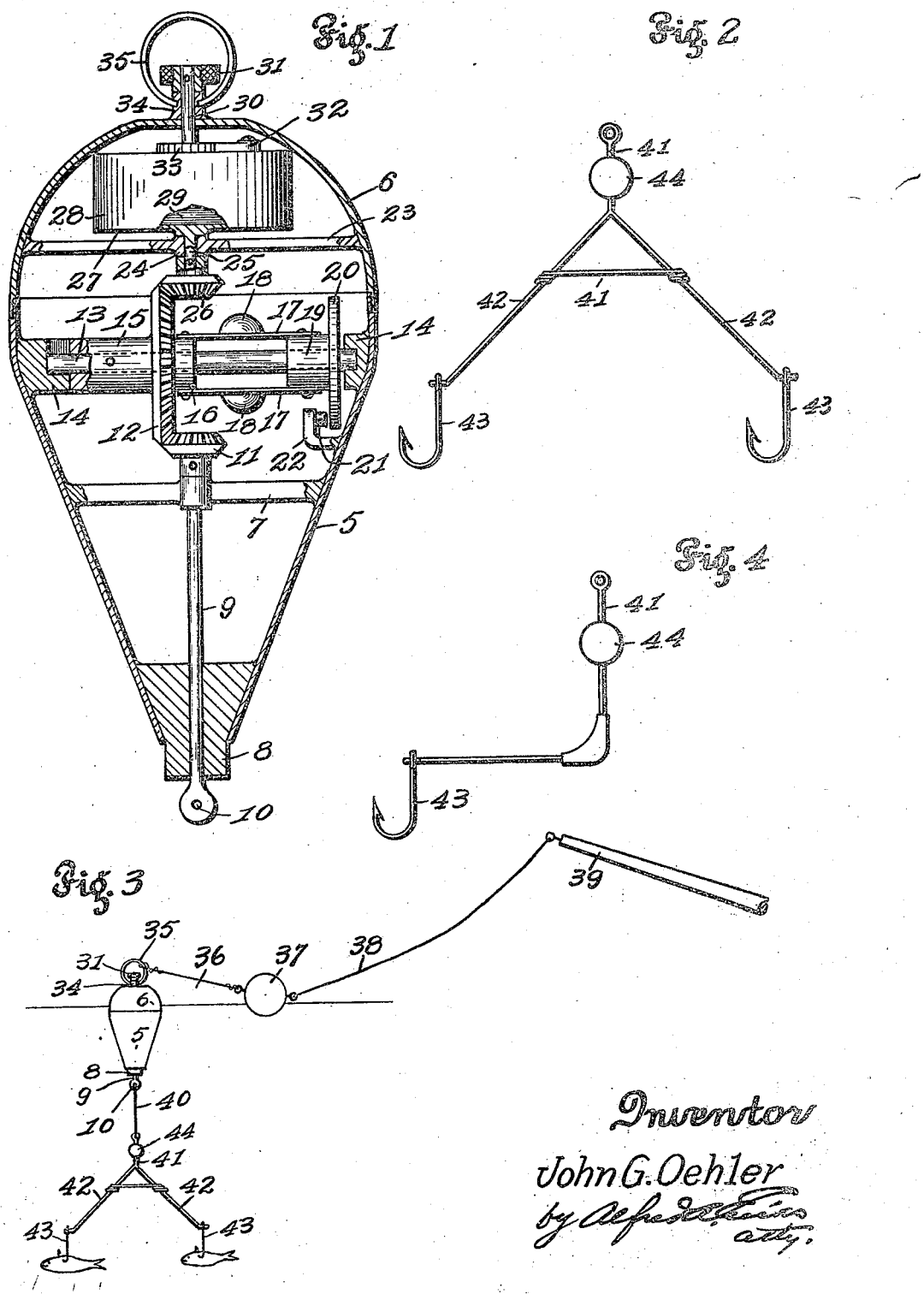
Inventor
John G. Oehler

UNITED STATES PATENT OFFICE.

JOHN G. OEHLER, OF ST. LOUIS, MISSOURI.

SUBMARINE MINNOW.

1,251,810. Specification of Letters Patent. Patented Jan. 1, 1918.

Application filed March 9, 1917. Serial No. 153,566.

*To all whom it may concern:*

Be it known that I, JOHN G. OEHLER, a citizen of the United States, and resident of St. Louis, Missouri, have invented certain new and useful Improvements in Submarine Minnows, of which the following is a specification.

This invention relates to improvements in a submarine minnow, and has for its object a float of hollow nature in which is located a mechanism arranged to be spring controlled so that power is imparted to the mechanism for rotating a shaft by which one or a plurality of minnows are rotated in race course fashion.

A further object of my invention is to construct a device which is to act as a float the same comprising a mechanism which will slowly rotate and to the mechanism is attached a tackle which supports minnows, and by means of the mechanism this tackle with the minnows are slowly turned in the water so as to give the minnows a swimming effect.

Figure 1, is a central cross sectional view of my improved float.

Fig. 2, is a detail view of the tackle attached to the float.

Fig. 3, is a plan view of the float and tackle connected and showing the relative position it assumes in the water.

Fig. 4, is a view of a modified form of tackle showing one hook arrangement.

In carrying out my invention I provide a float consisting of a housing composed of a lower shell 5 and an upper shell 6. These two shells are so arranged as to be connected together either in the manner as shown in the illustration by providing the same with screw threads, by friction, or otherwise. The object of this is so that the interior mechanism can be properly placed in position.

In the lower shell 5, I provide a bearing arm 7, and an end bearing 8. In these two bearings is supported a shaft 9, the end of the shaft projecting through the bearing 8 is provided with an eye 10, the opposite end of the shaft is provided with a gear pinion 11. This pinion 11 is enmeshed with a gear wheel 12, supported on the horizontal shaft 13, whose ends have bearing in bearing blocks 14, formed on the inner surface of the shell 5. The gear wheel 12 is provided with a sleeve 15, which is of such length as to contact with one of the bearing blocks 14, and hold the wheel in proper mesh with the pinion 11.

On the inner projecting end 16, of the sleeve I attach governor springs 17, which are provided with weights 18, the opposite ends of the springs being attached to a sleeve 19, which is provided with a friction disk 20. This sleeve and disk being freely mounted on the shaft 13, and the inner surface of the disk 20 is designed to have frictional contact with the flexible member 21, supported in the bracket 22. The object of this is to regulate the speed of the internal mechanism. This arrangement of governor being similar to that which is used in the ordinary graphophones.

In the upper section of the shell 6, I provide a cross arm 23. This is provided with a central bearing 24 through which projects a short shaft 25 provided with a gear pinion 26, which likewise meshes with a gear wheel 12. The shaft 25, is formed integral with or rigidly attached to the bottom 27 of the spring barrel 28 and in the spring barrel is located a spring 29. Its one end is attached to the spring barrel the other to the winding shaft 30, projecting upwardly through the top of the shell, and is provided with a winding head 31. On the drum is located a ratchet pawl 32 whose teeth are designed to engage with the teeth of the ratchet wheel 33 supported on the winding shaft 30. This shaft has bearing in the bearing block 34 formed on the top of the shell and to this block is attached a ring 35 to which one end of a rod or strand 36 is attached. The opposite end of this strand is attached to an independent or second float 37. This arrangement being for the purpose to keep the first mentioned float in vertical or perpendicular position while in the water. To the float 37 is likewise attached one end of a line 38 which is connected to a fishing rod 39.

To the eye 10 on the end of the shaft 9, is attached one end of a line, cord or rod 40, the same being so arranged or prepared as to be sufficiently rigid so as to turn with the rotation of the shaft and to the opposite end of the strand 40 is connected a tackle 41 consisting of projecting arms 42, their ends being spaced a suitable distance apart and on these ends are attached the hooks 43 for supporting the minnows. This tackle is also provided with a sinker 44 which will keep the tackle properly submerged and also assist in keeping the float perpendicular in the water.

By this arrangement the mechanism in the float is wound and by means of the recoil of the spring the mechanism is placed in rotation imparting a rotating movement to the tackle which causes the minnows to assume a swimming motion.

Referring to Fig. 4, I show a tackle where one arm is used instead of two as shown in Fig. 2, and when this arrangement is made use of it is preferably constructed of a wire so that its right-angular arrangement will always be intact.

Having fully described my invention what I claim is:

1. A device of the character described comprising a float, a spring controlled rotating mechanism mounted in the float, a governor forming part of the mechanism for controlling the speed of the same, a minnow supporting tackle attached to the rotating mechanism whereby the minnow is operated in a circular movement around its center, a ring attached to the top of the float, an auxiliary float and line attached to the ring and a fishing line attached to the auxiliary float by which the minnow supporting float is prevented from rotating in the water, substantially as specified.

2. A device of the character described comprising a float, a spring actuated rotating mechanism located therein, a governor located in the float for controlling the movement of the rotating mechanism, a winding knob located on the top of the float, a ring attached to the top of the float, a shaft vertically located in the float and connected to the rotating mechanism, a minnow supporting tackle consisting of auxiliary bars connected to the vertical shaft whereby the minnows are operated in a circular producing and swimming action to the minnow and an auxiliary float, a short line connected to the ring to prevent the float from rotating in the water during the rotating action of the mechanism located therein, substantially as specified.

3. A device of the class described comprising a hollow water type float composed of top and lower sections, a spring motor mounted in the top section, a vertical shaft mounted in the bottom section and extending through the lower end thereof, an eye formed in the projecting end of the vertical shaft, a means for winding the motor located outside of and above the top section, a horizontal shaft located in the lower section, a governor mounted on the horizontal shaft for regulating the speed of the motor, bevel gears for imparting rotation to the horizontal and vertical shafts and an angular bait suspending means attached to the eye of the vertical shaft, substantially as specified.

4. A device of the class described comprising a hollow water tight float composed of top and lower sections, a spring motor mounted in the top section, a vertical shaft mounted in the bottom section and extending through the lower end thereof, an eye formed in the projecting end of the vertical shaft, a means for winding the motor located outside of and above the top section, a horizontal shaft located in the lower section, a governor mounted on the horizontal shaft for regulating the speed of the motor, bevel gears for imparting rotation to the horizontal and vertical shafts and an angular bait suspending means attached to the eye of the vertical shaft, and a weight located in the bottom of the lower section to counterbalance the motor in the upper section, substantially as specified.

In testimony whereof I have signed my name to this specification in presence of two subscribing witnesses.

JOHN G. OEHLER.

Witnesses:
ALFRED A. EICKS,
WALTER C. STEIN.